Figure 1:
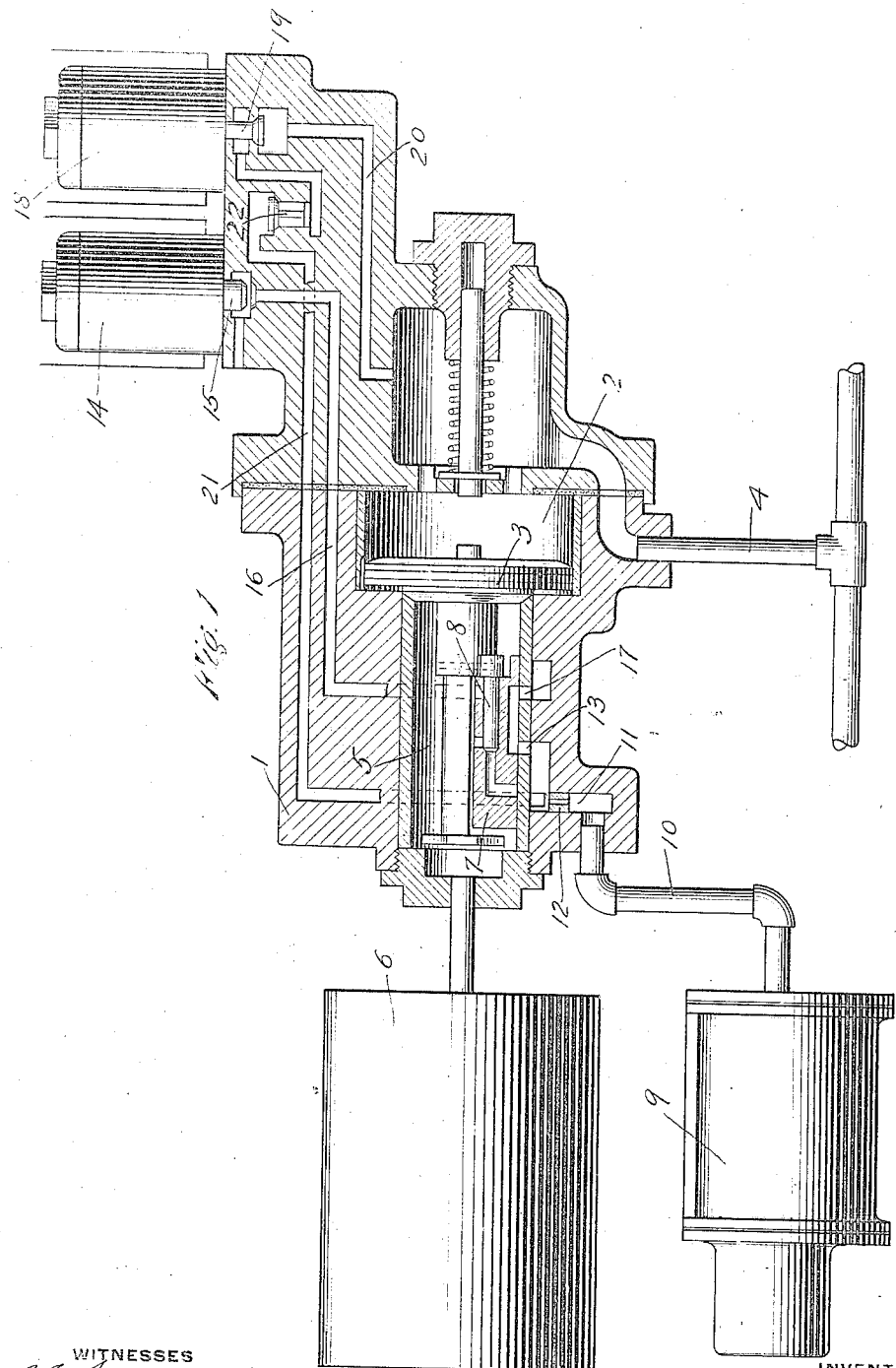

W. V. TURNER.
ELECTROPNEUMATIC BRAKE APPARATUS.
APPLICATION FILED JULY 10, 1914.

1,165,639.

Patented Dec. 28, 1915.
2 SHEETS—SHEET 1.

WITNESSES

INVENTOR
Walter V. Turner
by Wm. M. Cady
Att'y.

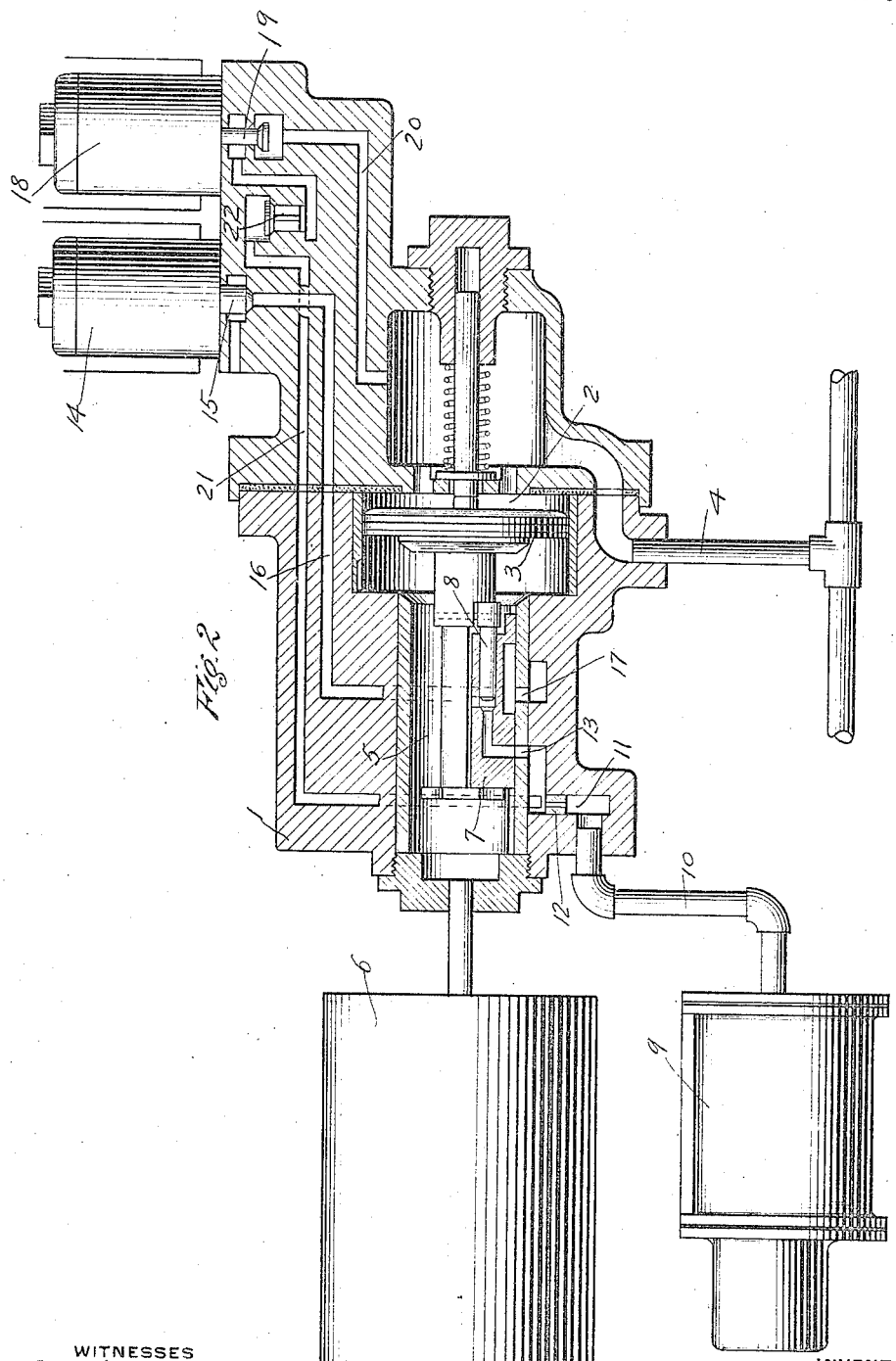

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE APPARATUS.

1,165,639.  Specification of Letters Patent.  Patented Dec. 28, 1915.

Application filed July 10, 1914. Serial No. 850,173.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brake Apparatus, of which the following is a specification.

This invention relates to fluid pressure brakes, and more particularly to a brake apparatus having electrical means for effecting reductions in brake pipe pressure.

My invention has reference more particularly to an automatic valve device operating upon a reduction in brake pipe pressure for effecting an application of the brakes and in which an electro-magnet controlled valve is employed for venting fluid from the brake pipe.

With the above type of brake apparatus, the passages through which the magnet valve vents fluid from the brake pipe are so restricted that the maximum rate of reduction in brake pipe pressure which may be effected by the opening of the magnet valve is limited in order to prevent such a reduction in brake pipe pressure as would effect the movement of the automatic valve device to emergency position. However, there is liable to be leakage from the brake pipe in addition to the venting of fluid therefrom by the action of the magnet valve so that the combined effect of the brake pipe leakage and the magnet valve venting may be sufficient to cause movement of the automatic valve device to emergency position.

In order to obviate the above difficulty, the principal object of my invention is to provide improved means for limiting the rate of reduction in brake pipe pressure upon operation of the magnet vent valve.

In the accompanying drawings; Figure 1 is a sectional view of an electro-pneumatic brake apparatus embodying my improvement and showing the automatic valve device in normal release position and Fig. 2 a similar view, showing the parts in electric service application position.

My invention is adapted to be employed in connection with various more or less complex valve devices designed for use on electric traction and steam roads, but to illustrate a simple application of the invention, the drawings merely show an ordinary triple valve device and a magnet controlled valve for venting fluid from the brake pipe.

The triple valve device comprises the usual casing 1 having a piston chamber 2 containing piston 3 connected to brake pipe 4 and valve chamber 5 open to the auxiliary reservoir 6 and containing main slide valve 7 and auxiliary valve 8 adapted to be operated by piston 3.

Brake cylinder 9 is connected by pipe 10 to passage 11 containing a choke plug 12 and a port 13 in the main slide valve seat opens into said passage.

The electric release may be controlled by a magnet 14 and valve 15 of the usual type having a release passage 16 leading to the triple valve exhaust port 17.

The electric service may be controlled by a magnet 18 adapted to operate a valve 19 which governs communication from a passage 20, leading to the brake pipe volume, to a vent passage 21 containing a non-return check valve 22.

According to my invention, the vent passage 21 leads to passage 11 on that side of the choke 12 away from the brake cylinder, so that fluid vented from the brake pipe flows through the choke to the brake cylinder. By this arrangement, the rate of reduction in brake pipe pressure through the opening of the service magnet valve cannot exceed the rate at which fluid flows from the auxiliary reservoir to the brake cylinder, since fluid from both the brake pipe and the auxiliary reservoir must flow through the choke plug 12. As a consequence, if there is brake pipe leakage, the increased reduction in brake pipe pressure thus produced will tend to effect an increased flow of fluid from the auxiliary reservoir and to correspondingly reduce the flow from the brake pipe past the service magnet valve. In fact, the brake pipe pressure may be less than the pressure in passage 11 on the side of the choke remote from the brake cylinder in which case, fluid would flow back through passage 21 to the brake pipe were it not for the check valve 22 which prevents such back flow.

When there is little or no leakage from the brake pipe, the triple valve moves in the usual manner to service application position, and the service port is only slightly opened, so that the flow from the auxiliary reservoir to the brake cylinder is reduced, thus permitting a corresponding increase in the rate of flow from the brake pipe to the brake cylinder.

The size of the restricted port through the choke 12 is preferably such as to give the desired predetermined rate of flow from the auxiliary reservoir to the brake cylinder, and since the rate of reduction in brake pipe pressure cannot exceed this rate, possible movement of the triple or other automatic valve to emergency position in service applications by excessive reductions in brake pipe pressure is prevented.

Having now described my invention, what I claim as new and desire to secure by Letters Patent, is:

1. In a fluid pressure brake, the combination with a brake pipe and an automatic valve device operated upon a reduction in brake pipe pressure for supplying fluid to the brake cylinder through a restricted port, of electrically controlled means for venting fluid from the brake pipe through said port.

2. In a fluid pressure brake, the combination with a brake cylinder, a brake pipe, a choke plug and an automatic valve device operated upon a reduction in brake pipe pressure for supplying fluid to the brake cylinder through said choke plug, of electrically controlled means for venting fluid from the brake pipe through a restricted port to the brake cylinder.

3. In a fluid pressure brake, the combination with a brake cylinder, brake pipe, reservoir, and a valve device operated upon a reduction in brake pipe pressure for supplying fluid from the reservoir through a restricted port to the brake cylinder, of electrically controlled means for venting fluid from the brake pipe to the brake cylinder through said restricted port.

4. In a fluid pressure brake, the combination with a brake cylinder, brake pipe, reservoir, and a valve device having a choke plug with a restricted port and operated upon a reduction in brake pipe pressure for supplying fluid from said reservoir through said restricted port to the brake cylinder, of electrically controlled means for venting fluid from the brake pipe to the brake cylinder through said restricted port.

5. In a fluid pressure brake, the combination with a brake cylinder, brake pipe, reservoir, and a valve device having a choke plug with a restricted port and operated upon a reduction in brake pipe pressure for supplying fluid from said reservoir through said restricted port to the brake cylinder, of electrically controlled means for venting fluid from the brake pipe to the brake cylinder through said restricted port, and a check valve for preventing back flow through said electrically controlled means to the brake pipe.

In testimony whereof I have hereunto set my hand.

WALTER V. TURNER.

Witnesses:
A. M. CLEMENTS,
S. W. KEEFER.